US006594660B1

(12) United States Patent
Berkowitz et al.

(10) Patent No.: US 6,594,660 B1
(45) Date of Patent: Jul. 15, 2003

(54) SHARE LATCH CLEARING

(75) Inventors: Brian T. Berkowitz, Seattle, WA (US); Peter A. Christofferson, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/490,416

(22) Filed: Jan. 24, 2000

(51) Int. Cl.[7] .............................................. G06F 17/30
(52) U.S. Cl. .................................. 707/8; 707/9; 707/1
(58) Field of Search .............................. 707/1–2, 6–10, 707/100–102, 200–206

(56) References Cited

U.S. PATENT DOCUMENTS

| | | | |
|---|---|---|---|
| 4,914,569 A | 4/1990 | Levine et al. | |
| 5,745,904 A | 4/1998 | King et al. | |
| 5,832,508 A | 11/1998 | Sherman et al. | |
| 5,835,766 A | 11/1998 | Iba et al. | |
| 5,878,410 A | 3/1999 | Zbikowski et al. | |
| 6,029,177 A | 2/2000 | Sadiq et al. | |
| 6,374,264 B1 * | 4/2002 | Bohannon et al. | 707/202 |

OTHER PUBLICATIONS

U.S. patent application Ser. No. 09/135,917, Berkowitz et al., filed Aug. 18, 1998.

Krakovsky, M., "Understanding The Oracle Server", Chapter 4, pp. 35–48, Chapter 6, pp. 67–79, Chapter 12, pp. 157–169, 1996 Prentice Hall PTR.

Gray, J., Reuter, A., "Transaction Processing: Concepts and Techniques", Chapters 9 and 10, pp. 449–525, Morgan Kaufman Publishers, 1993.

In–Memory Data Management Technical White Paper, verison 3.2, Jun., 1999, available on www.timesten.com web site.

In–memory data management in the application tier paper, available on www.timesten.com web site, printed on Apr. 15, 2000.

* cited by examiner

Primary Examiner—Alford W. Kindred
(74) Attorney, Agent, or Firm—Klarquist Sparkman, LLP

(57) ABSTRACT

Clearing share latches for databases, such as in-memory databases, is disclosed. In one embodiment, a computerized system includes a database having a number of sections, a client process and a core process. The client process is capable of asserting a share latch on a section of the database. The core process is capable of asserting an exclusive latch on a section of the database. The core process is further capable of clearing the share latch asserted by the client process, upon termination of the client process while the share latch is still asserted. Specific methods for such clearing, as well as latch logs, are also disclosed.

39 Claims, 14 Drawing Sheets

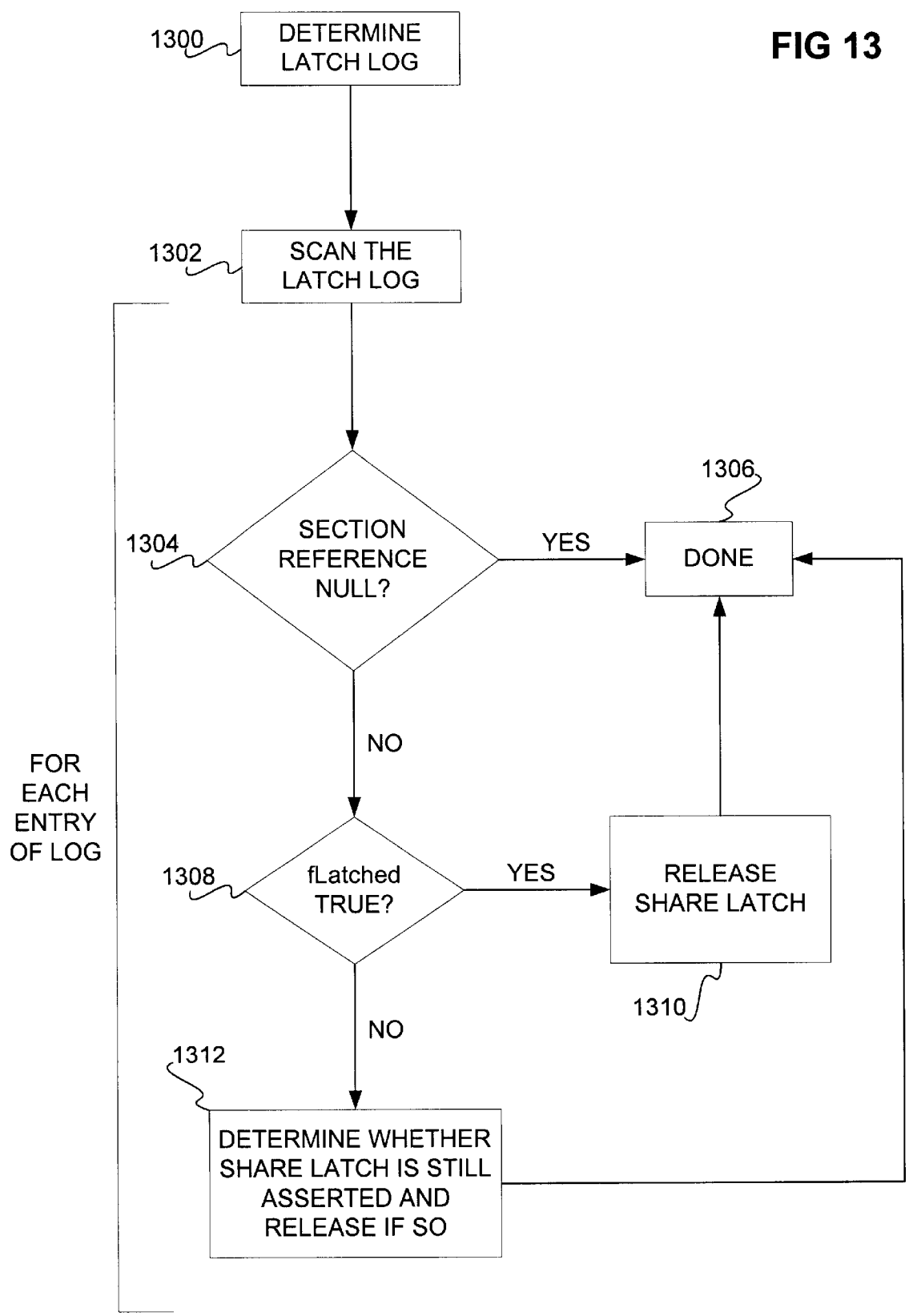

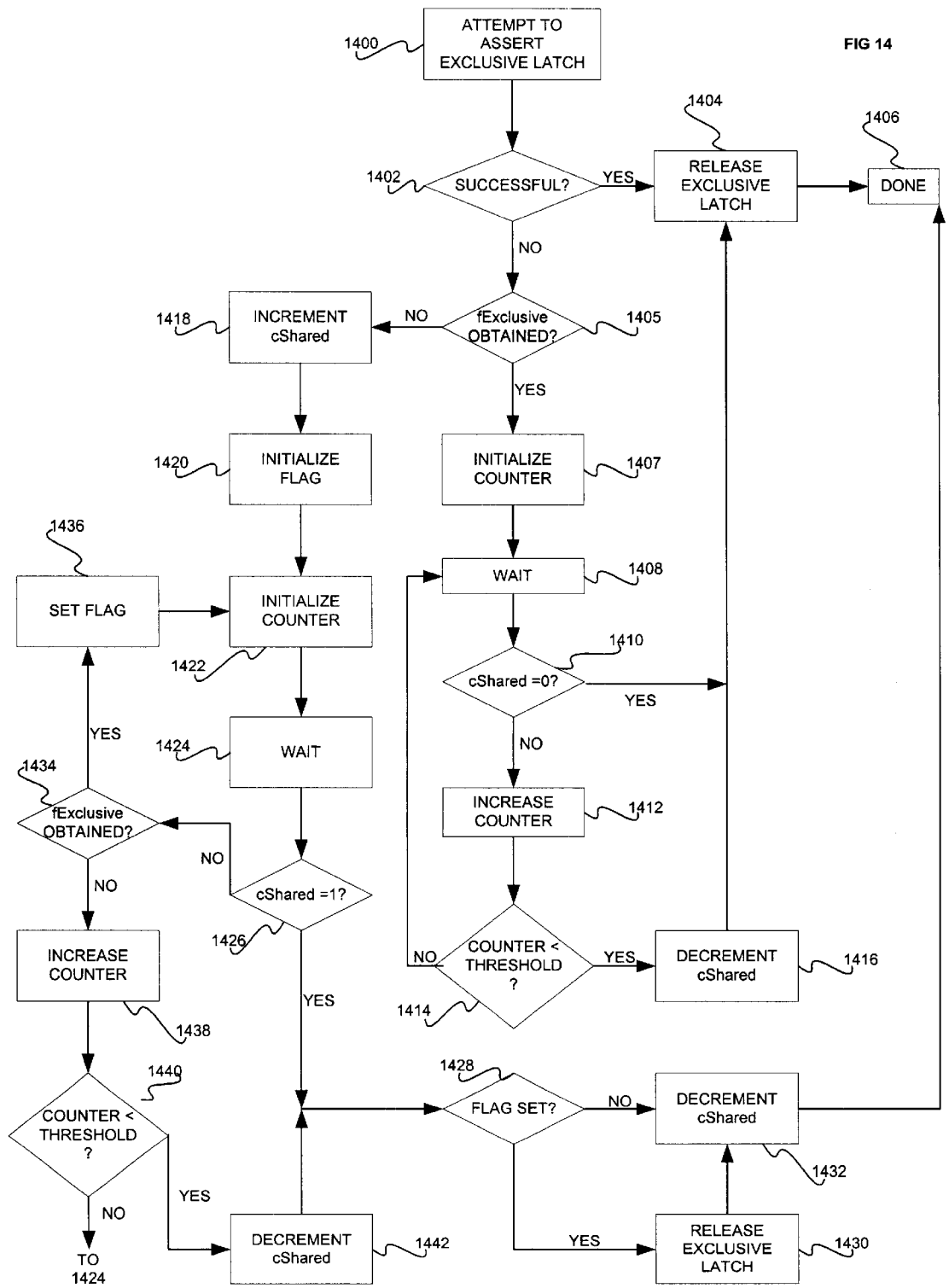

SHARE LATCH CLEARING

FIELD OF THE INVENTION

This invention relates generally to databases, such as in-memory databases (IMDB's), and particularly to clearing share latches on sections of such database that may still be asserted upon the termination of their asserting client processes.

BACKGROUND OF THE INVENTION

Databases, such as in-memory databases (IMDB's), generally allow for a number of different processes to access the database at once. A database may be divided into different sections, or pages. A process may therefore "latch," or assert a latch on, a section of the database while it accesses the section, so that the data residing in the section cannot be modified while the process accesses it.

Different types of processes may resort to different types of latches for accessing the database. For example, a core process can be non-restrictively defined as an operating system or other process by which database data can be modified. Such a core process may be able to assert an exclusive latch on a database section, so that they are able to read from and write to the section without any other process accessing the data.

Other processes can be non-restrictively defined as client processes which are able to access but not modify database data. Such client processes may be able to assert a share latch on a database section, so that they are able to read from the section. The latches are share latches in that other share latches of other processes can access the database section at the same time. Because share latches do not allow their asserting processes to modify the data, simultaneous or concurrent access is permissible.

Generally, when a core process needs to assert an exclusive latch on a database section, it must first wait for any share latches on the section to be released. This is because the assertion of the exclusive latch implies that modification to the data in the database section may occur, which is problematic if other processes are accessing the data at the same time via share latches. Therefore, a core process may first signal its intention to assert an exclusive latch on the database section, so that no new share latches are asserted on the section. The core process then waits for existing share latches to be released prior to asserting its exclusive latch.

A difficulty arises, however, when a client process is terminated prior to releasing any share latches it had asserted on sections of the database. Unless these share latches are cleared, a core process may not be able to assert exclusive latches on the database sections. A client process may terminate prior to releasing its share latches because it unexpectedly crashed or otherwise terminated in an irregular manner; because the client process may be poorly coded, such that it terminates normally, but without first clearing its share latches; etc.

For this and other reasons, there is a need for the present invention.

SUMMARY OF THE INVENTION

The invention relates to clearing share latches for databases, such as in-memory databases. In one embodiment, a computerized system includes a database, a client process and a core process. The database has a number of sections, and can be an in-memory database. The client process is capable of asserting a share latch on a section of the database, where in one embodiment the share latch permits the client process to have shared read-only access to the section. The core process is capable of asserting an exclusive latch on a section of the database, where in one embodiment the exclusive latch permits the core process to have exclusive read-and-write access to the section. The core process is further capable of clearing the share latch asserted by the client process, upon termination of the client process—unexpected or otherwise—while the share latch is still asserted.

In one embodiment, a latch log is associated with a client process. The latch log has a number of entries. Each entry can have a latch flag indicating whether the client process has asserted a share latch corresponding to the entry, as well as a pointer or other reference to a section of memory against which the share latch has been asserted. In one embodiment, the latch flag is false, and the reference contains a null value, if an entry does not correspond to an active share latch of the process. However, the client process may unexpectedly terminate—for example, it may "crash"—such that the reference points to a memory section while the latch flag is false. Thus, one embodiment of the invention is able to determine whether a share latch is still asserted on the section, taking into account potential occurrence that the latch flag of the entry is incorrect.

The invention includes computer-implemented methods, machine-readable media, computerized systems, and computers of varying scopes. Other aspects, embodiments and advantages of the invention, beyond those described here, will become apparent by reading the detailed description and with reference to the drawings.

BRIEF DESCRIPTION OF THE DRAWINGS

FIG. 13 is a flowchart of a method for a core process to release or clear share latches still asserted by a client process that has terminated by examining the latch log of the process, according to one embodiment of the invention; and, FIG. 14 is a flowchart of a method for a core process to release or clear share latches still asserted by a client process that has terminated, with the knowledge that the client process has terminated while acquiring or releasing a share latch, according to one embodiment of the invention.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
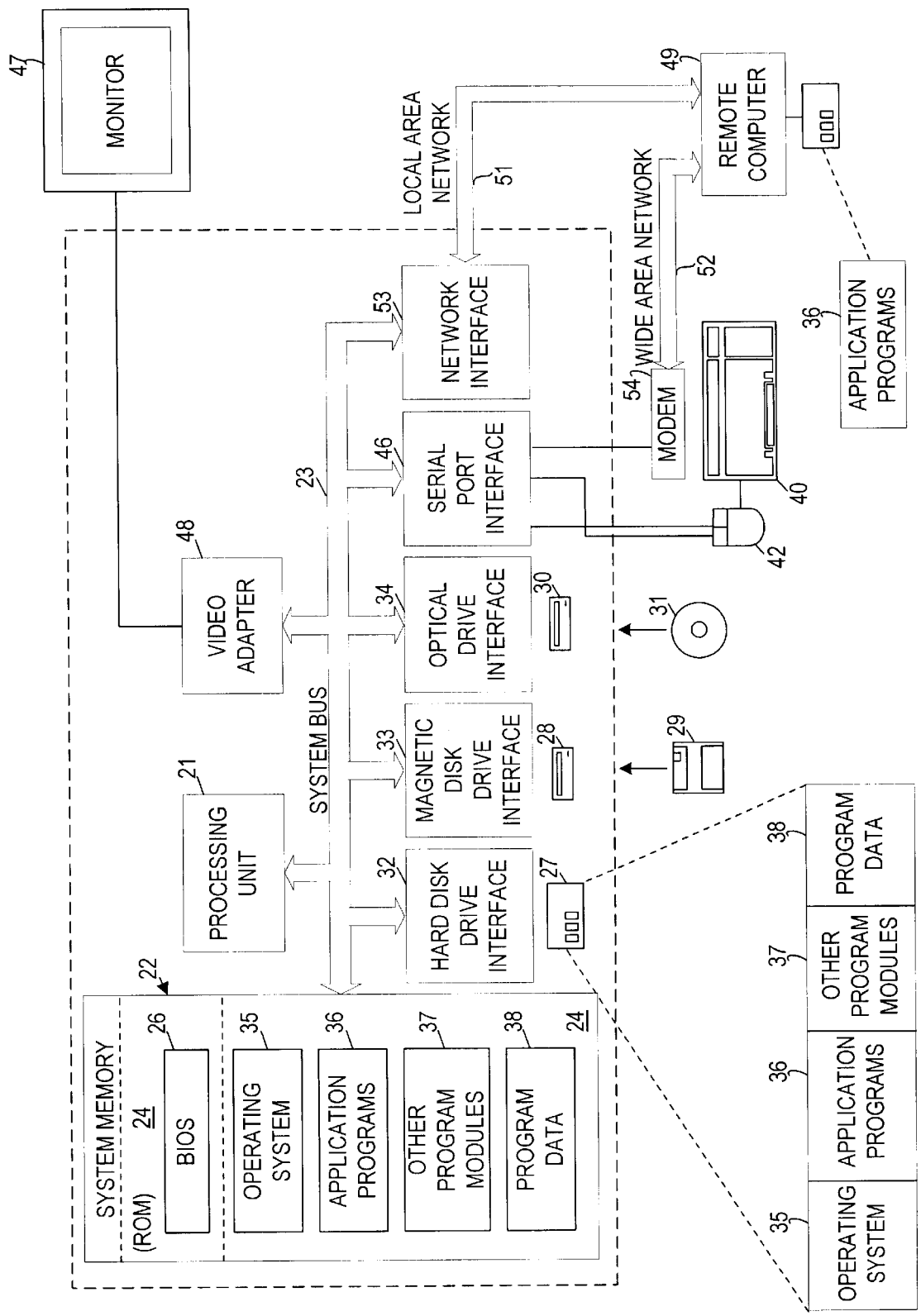
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29 and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Databases, Share Latches, and Exclusive Latches

Figure 2:
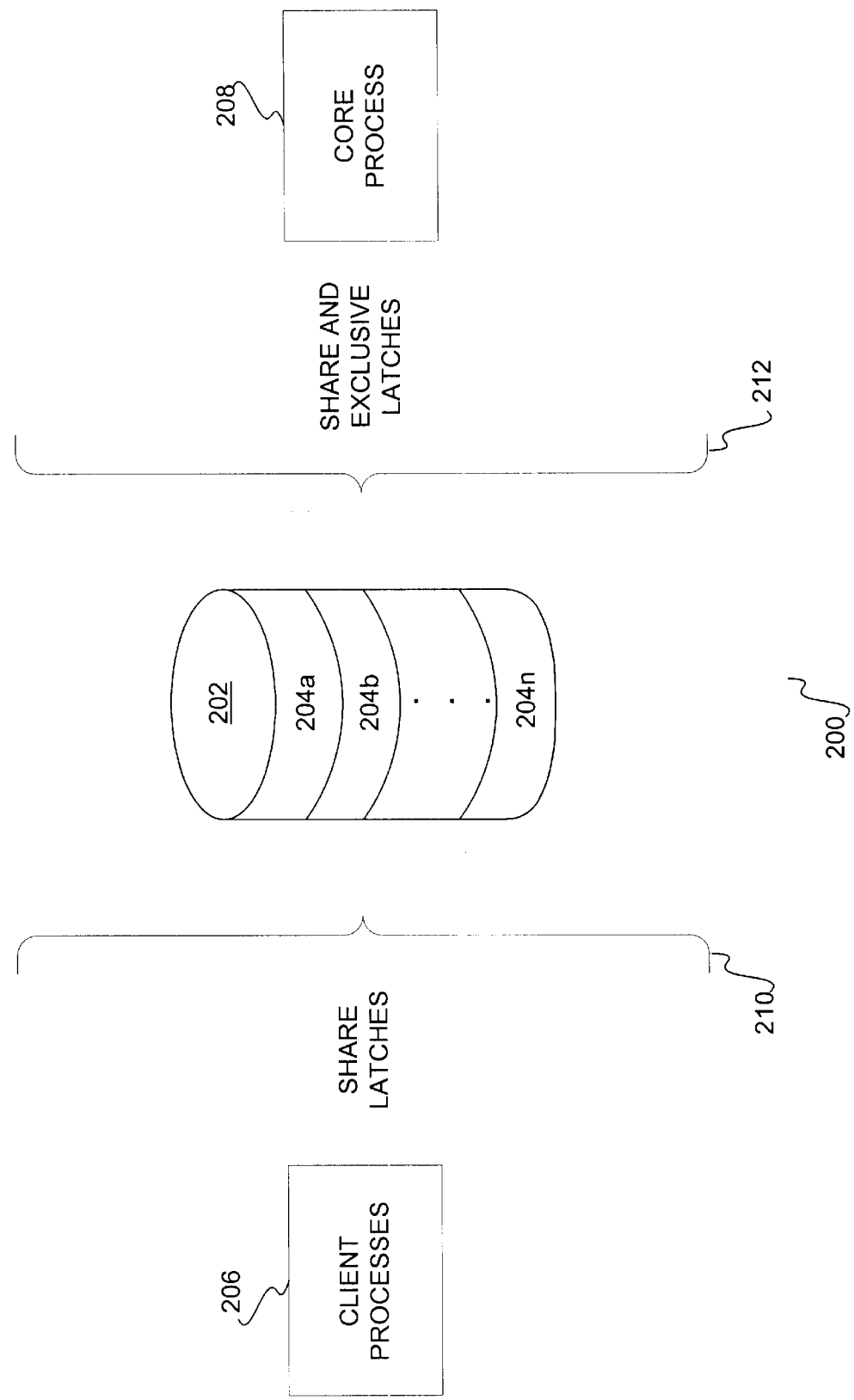
FIG. 2 is a diagram of a system according to an embodiment of the invention.

In this section of the detailed description, databases, share latches, and exclusive latches are described, in accordance with one embodiment of the invention. Referring first to FIG. 2, a diagram of a system 200 according to an embodiment of the invention is shown. The system 200 includes a database 202, a plurality of client processes 206, and a core process 208.

The database 202 can be an in-memory database (IMDB) in one embodiment. That is, the database 202 can reside on a storage device such as a hard disk drive, and can also have at least parts thereof reside in memory, such as random-access memory (RAM). The database 202 is divided into a plurality of sections 204a, 204b, . . . , 204n. Each section can be referred to as a database section, and corresponds to a unit that the client processes 206 and the core process 208 can latch, either by a share latch or an exclusive latch, such that the section is locked to prevent changes thereto when a latch is asserted thereon. In one embodiment, each section corresponds to a page within memory, which can more generally be referred to as a memory section, in the case where the database 202 is an in-memory database, such as a sixteen-kilobyte page within memory.

As represented in FIG. 2 by curly bracket 212, the core process 208 is able to assert both share and exclusive latches on the plurality of sections 204a, 204b, . . . , 204n of the database 202. A core process is defined non-restrictively as a process that is able to assert an exclusive latch on a section of the database 202, in addition to being able to assert a share latch on a section of the database 202. In one embodiment, a core process is part of the operating system itself, such that it is a trusted process, in the sense that it is trusted not to crash as may another process. Furthermore, in one embodiment, the core process is capable of clearing a share latch asserted by a client process upon termination thereof, while the share latch is still being asserted, in conjunction with the manner described later in the detailed description. Finally, in one embodiment, a core process can correspond to a means for asserting an exclusive latch on a section—as well as for clearing a share latch asserted by the client process upon termination thereof, while the share latch is still being asserted, in conjunction with the manner described later in the detailed description.

As also represented in FIG. 2 by curly bracket 210, the client processes 206 are able to assert only share latches on the plurality of sections 204a, 204b, . . . , 204n of the database 202. A client process is defined non-restrictively as a process that is able to assert only a share latch on a section of the database 202. In one embodiment, a client process is a process run by an application or other program that is not a part of the operating system itself, such that it is not inherently a trusted process, in the sense that it is not trusted to not crash as compared to a core process, for example. In one embodiment, one or more client processes can correspond to a means for asserting a share latch on a section.

Each of share latches and exclusive latches is asserted against a particular section of the database 202, as determined by its asserting process. A share latch permits the asserting process to have non-exclusive read-only access to a database section. The access is non-exclusive in that other processes may also have share latches on the database section. The access is read-only in that the process asserting the latch is not allowed to write or otherwise modify the data stored in the database section, but only to read the data stored in the database section. Thus, a share latch is asserted on a database section by a process when read-only access is desired on the data of the section. The presence of a share latch means that the data within that section cannot be modified while any share latch is asserted thereon.

Conversely, an exclusive latch permits the asserting core process to have exclusive read-and-write access to a database section. The access is exclusive in that when an exclusive latch is asserted on the database section, no other process, core or client, is able to access the database section. That is, when an exclusive latch is asserted on a database section, no other latch, exclusive or share, is able to concurrently be asserted on the database section, until the exclusive latch is released or cleared. The access is read-and-write access in that the core process asserting the exclusive latch is allowed to write or otherwise modify the data stored in the database, in addition to being able to read the data stored in the database section. Thus, an exclusive latch is asserted on a database section by a core process when read-and-write access is desired on the data of the section. The presence of an exclusive latch means that the data within that section can be modified, such that no other process can access the data; that is, no other latch, exclusive or share, can be asserted on the section of the database.

In one embodiment of the invention, each of the client processes 206 and the core process 208 of the system 200 of FIG. 2 includes one or more execution threads. Each execution thread of each process is able to assert its own latches—share latches only in the case of threads that are a part of client processes, and share and exclusive latches in the case of threads that are a part of the core process. Each execution thread is able in one embodiment to run concurrently, or in parallel, with other threads, both of the same and different processes. Thus, for this embodiment of the invention, when it is referred to herein that a process is asserting a latch, or that there is a latch of a process, those of ordinary skill within the art can appreciate that this means that a thread of a process is asserting a latch, or that there is a latch of a thread of a process.

Figure 3:
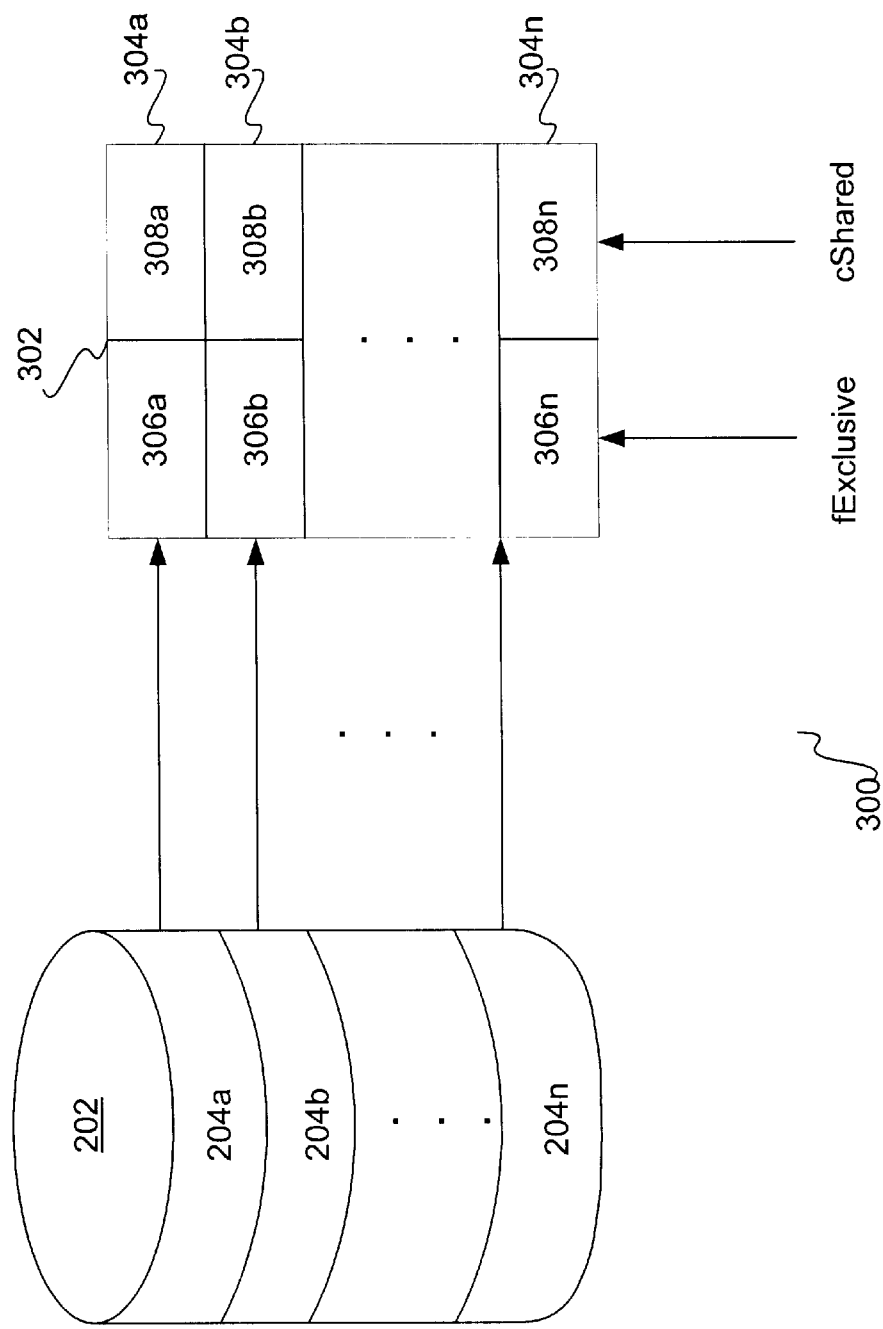
FIG. 3 is a diagram of a system according to another embodiment of the invention, and particularly showing a data structure.

Referring next to FIG. 3, a diagram of a system 300 according to an embodiment of the invention is shown. The system 300 includes the database 202 of FIG. 2, and also a data structurer 302. The data base 202 includes a plurality of sections 204a, 204b, ... , 204n, and is the same as the database 202 described in conjunction with FIG. 2.

The data structure 302 can be stored in one embodiment of the invention in memory, such as random-access memory (RAM). The data structure 302 includes an entry corresponding to each section of the database 202. Therefore, the entry 304a corresponds to the section 204a, the entry 304b corresponds to the section 204b, and so on, such that the entry 304n corresponds to the entry 204n. Each entry has two parts, a Boolean or other flag labeled fExclusive indicating whether an exclusive latch has been asserted on its corresponding database section, and an integer or other type of counter labeled cShared indicating the number of share latches that have been asserted on its corresponding database section. Thus, the entry 304a has an Exclusive flag 306a and a cShared counter 308a, the entry 304b has an fExclusive flag 306b and a cShared counter 308b, and so on, such that the entry 304n has an fExclusive flag 306n and a cShared counter 308n.

In one embodiment, the fExclusive flag of an entry is true when an exclusive latch has been asserted against the database section corresponding to the entry, and is false when no exclusive latch has been so asserted. In one embodiment, the cShared counter of an entry indicates the number of share latches that have been asserted against the database section corresponding to the entry. When the cShared counter is equal to zero, this means that no share latches have been asserted on the database section corresponding to the entry.

Figure 4:
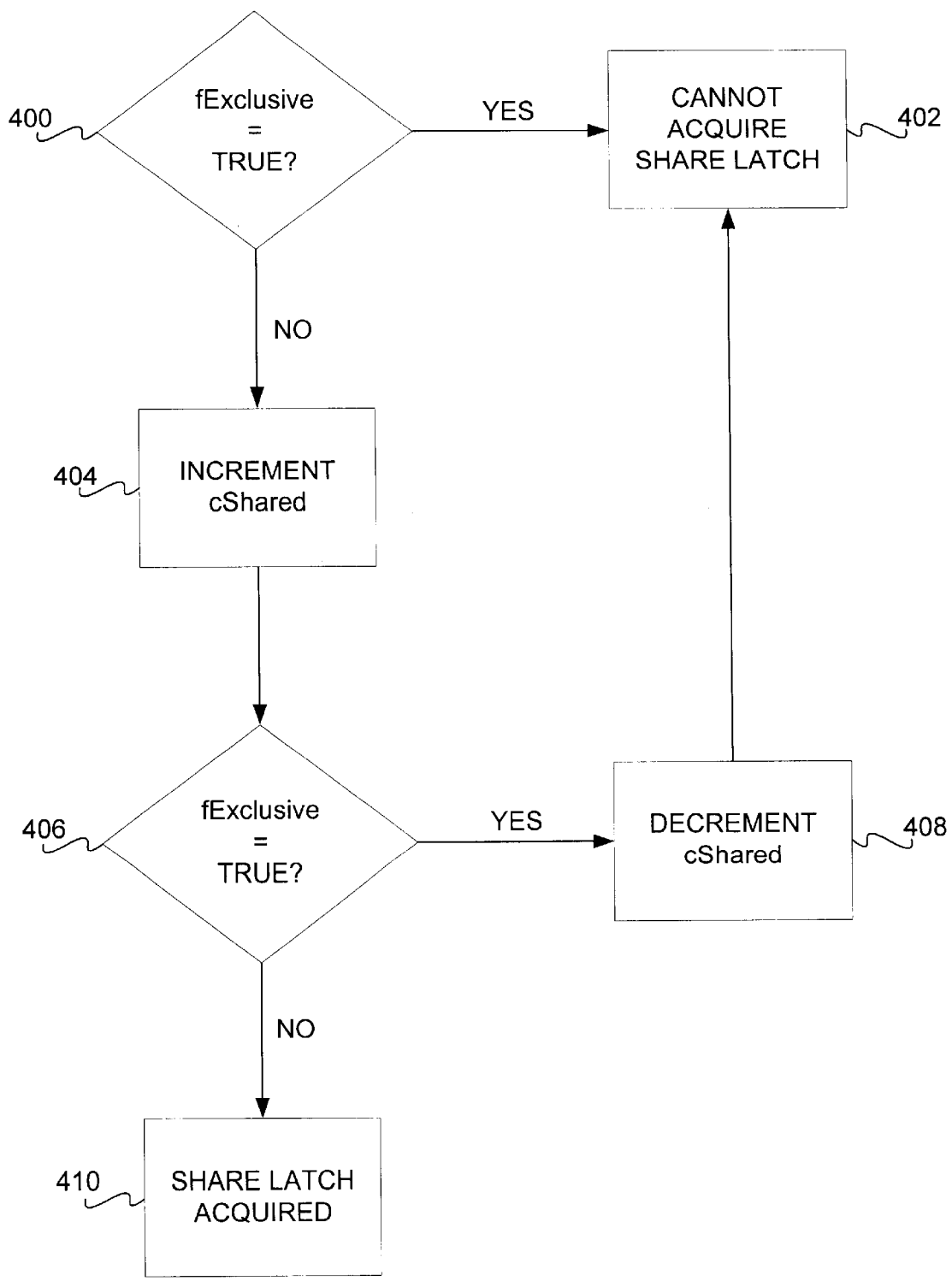
FIG. 4 is a flowchart of a method for performance and/or calling by a core or client process to assert a share latch on a database section, according to an embodiment of the invention.

The manners by which share and exclusive latches are acquired (that is, asserted) and released, according to one embodiment, are now described. Referring first to FIG. 4, a flowchart of a method for acquiring a share latch, as may be performed by either a core or a client process, according to one embodiment of the invention, is shown. The method of FIG. 4 is performed when a process desires to assert a share latch on a database section.

In 400, the fExclusive flag of the entry of the data structure corresponding to the database section against which a share latch is desired to be asserted is examined to determine whether it is true or false. If the flag is true, this indicates that an exclusive latch has already been asserted on this database section, such that no share latch can be asserted thereon. Therefore, the method proceeds to 402, where the method returns false to indicate that a share latch cannot be acquired.

Otherwise, the method proceeds to 404, where the cShared counter of the entry of the data structure corresponding to the database section against which a share latch is desired to be asserted is incremented by one. In one embodiment, an interlocked increment operation is used to increment the cShared counter. This operation is an atomic operation that increments a counter.

The method then proceeds to 406, where again the fExclusive flag is examined to determined whether it is true or false. This is done just in case an exclusive latch was asserted on the database section during the incrementation process of 404. If the fExclusive flag is true, then the method proceeds to 408, where the cShared counter is decremented by one—since the fExclusive flag is true, no share latch can be acquired on the database section, such that the cShared counter must be decreased back to its original value. In one embodiment, an interlocked decrement operation is used to decrement the cShared counter. This operation is an atomic operation that decrements a counter. The method then proceeds to 402, where the method returns false to indicate that a share latch cannot be acquired.

Otherwise, the method proceeds from 406 to 410, where the method returns true. The returning of true by the method is done to indicate that a share latch has been acquired. That is, the process calling the method of FIG. 4 for asserting a latch on a desired database section is successful when the method returns true, and is unsuccessful when the method returns false. In one embodiment, if a process desires to wait for a share latch on the database section, it may first call the method of FIG. 4. If the method does not return true (that is, it returns false), then the process may wait for a predetermined time, and again call the method of FIG. 4. This process is repeated until a share latch is obtained—that is, until calling the method of FIG. 4 yields true.

To release a share latch previously successfully asserted on a database section, a process decrements the cShared counter of the entry of the data structure corresponding to the database section. In one embodiment, an interlock decrement operation can be utilized to accomplish this, as has been described.

Figure 5:
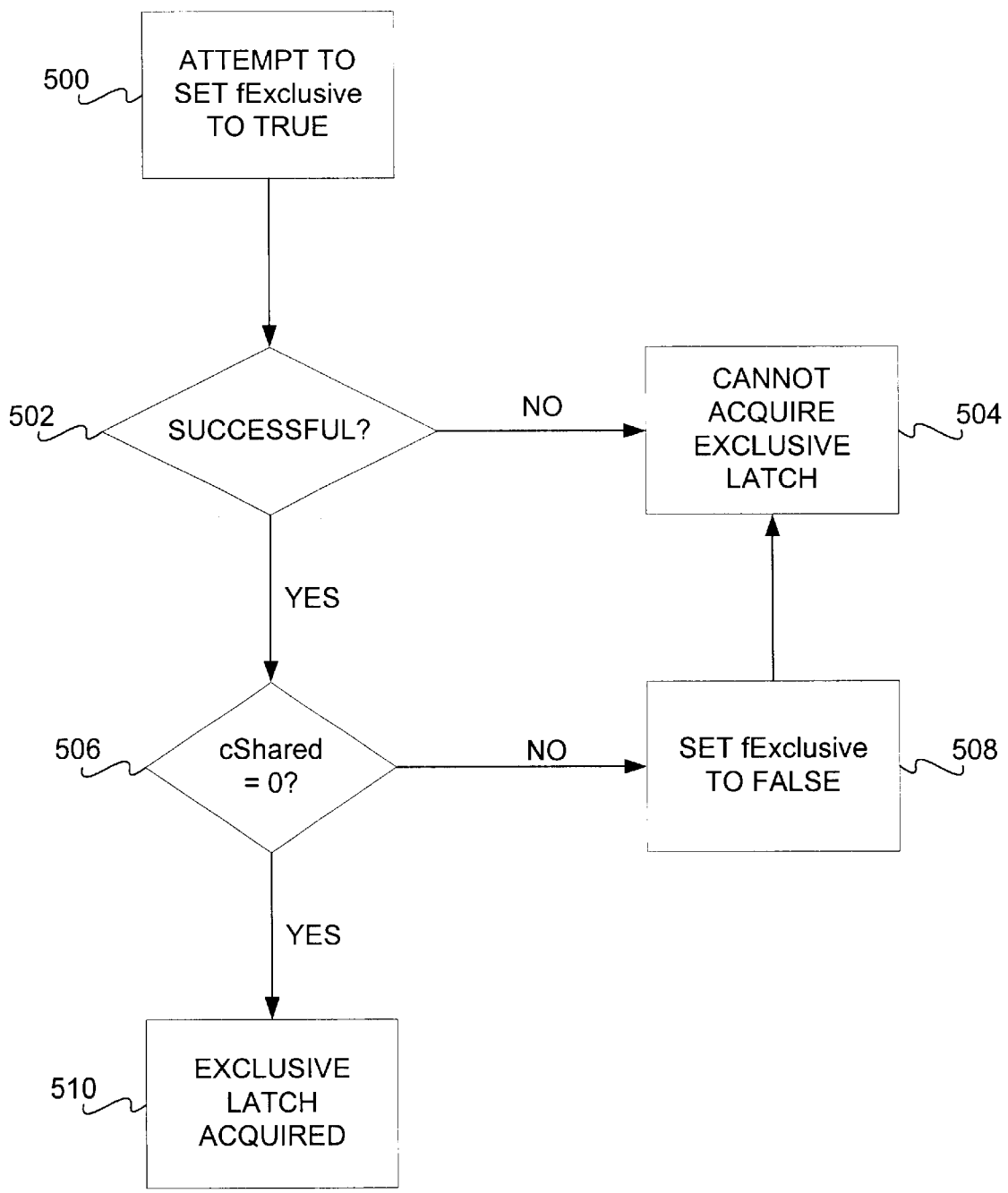
FIG. 5 is a flowchart of a method for performance and or calling by a core process to assert an exclusive latch on a database section, according to an embodiment of the invention, where the method yields true is such a latch is so obtained, and otherwise yields false.

Referring next to FIG. 5, a flowchart of a method for acquiring an exclusive latch, as may be performed by a core process, according to one embodiment of the invention, is shown. The method of FIG. 5 is performed when a core process desires to assert an exclusive latch on a database section. In 500, the method attempts to set the fExclusive flag of the entry of the data structure corresponding to the database section against which an exclusive latch is desired to be asserted. In one embodiment, this is accomplished by using an interlocked compare exchange operation. This operation sets the fExclusive flag to true only if the value of the fExclusive flag is currently false. This operation can be non-restrictively defined in one embodiment as an atomic test and set operation that allows only one process (that is, in one embodiment, only one thread of one process) to successfully set the fExclusive flag at a time, as can be appreciated by those of ordinary skill within the art. The result of this operation is true if the operation succeeded in setting the fExclusive flag to true, and false otherwise.

Therefore, from 502, if the setting of the fExclusive flag to true was unsuccessful in 500, then the method proceeds to 504, such that no exclusive latch can be asserted thereon, because an exclusive latch has already been asserted. In 504, the method returns false to indicate than an exclusive latch cannot be acquired.

Otherwise, the method proceeds to 506, where the cShared counter of the entry of the data structure corresponding to the database section against which an exclusive latch is desired to be asserted is examined. If the cShared counter is not zero—that is, if it is greater than zero—this indicates that one or more share latches have been asserted against the database section, such that an exclusive latch cannot be asserted thereon, and the method proceeds to 508. In 508, the fExclusive flag, having been set to true in 500, is reset to false, using an interlocked exchange operation in one embodiment. This operation sets the fExclusive flag to false, and in one embodiment can be non-restrictively defined as taking into account concurrent attempts to set the fExclusive flag by other processes (or, other threads of processes). The method then proceeds to 504, where the method returns false to indicate that an exclusive latch cannot be acquired.

Otherwise, the method proceeds from 506 to 510, where the method returns true. The returning of true by the method is done to indicate that an exclusive latch has been acquired. That is, the core process calling the method of FIG. 5 for asserting an exclusive latch on the desired database section is successful when the method returns true, and is unsuccessful when the method returns false.

Figure 6:
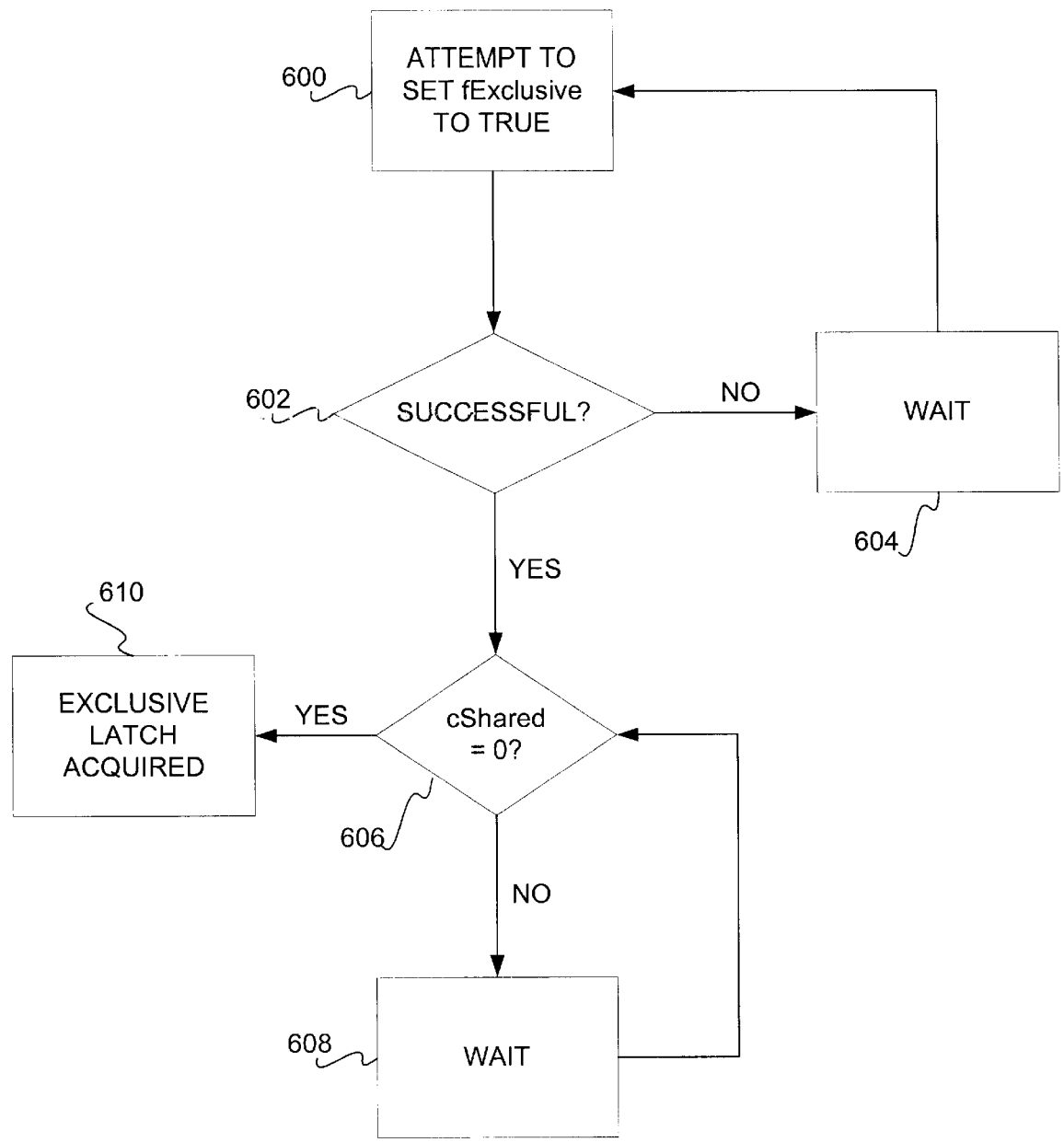
FIG. 6 is a flowchart of a method for performance and/or calling by a core process to assert an exclusive latch on a database section, according to another embodiment of the invention, where the method waits for such a latch to be obtained, and then yields true.

A core process may desire to wait until an exclusive latch can be asserted on a desired database section. To accomplish this, rather than calling the method of FIG. 5, waiting, and recalling the method until an exclusive latch has been acquired, in one embodiment, a different method is performed. Referring now to FIG. 6, a flowchart of such a method, according to an embodiment of the invention, is shown.

In 600, the method attempts to set the fExclusive flag of the entry of the data structure corresponding to the database section against which an exclusive latch is desired to be asserted. In one embodiment, this is accomplished by using an interlocked compare exchange operation, as described in conjunction with 500 of the method of FIG. 5. The result of 600 is true if the attempt to set the fExclusive flag was successful, and otherwise false. From 602, if the setting of the fExclusive flag to true was unsuccessful in 600, then the method proceeds to 604, where the method waits for a predetermined time, and then again attempts to set the fExclusive flag to true in 600.

Once the fExclusive flag has been set to true, the method proceeds from 602 to 606, where the cShared counter of the entry of the data structure corresponding to the database section against which an exclusive latch is desired to be asserted is examined. If the cShared counter is not zero—that is, if it is greater than zero—this indicates that one or more share latches have been asserted against the database section, such that an exclusive latch cannot yet be asserted thereon, and the method proceeds to 608. In 608, the method waits a predetermined length of time, and then again examines the cShared counter. Once the cShared counter is zero, then the method proceeds to 610, where the method returns true, to indicate that an exclusive latch has been acquired.

As described and as shown in FIG. 6, the method thereof has two waiting cycles: a first waiting cycle of 600, 602 and 604, to set the fExclusive flag to true, and a second waiting cycle of 606 and 608, to wait until the cShared counter is zero. The first waiting cycle is to wait until no other processes, or threads thereof, have asserted an exclusive latch against the desired database section. Once this is the case, then the fExclusive flag can be set to true by the process calling the method of FIG. 6.

Furthermore, once the fExclusive flag is set to true, no other share latches can be asserted against the desired database section, although share latches previously asserted may still be present. Therefore, the second waiting cycle is to wait for any share latches previously asserted to be released. Once this is the case, then the exclusive latch can be acquired. Thus, an "exclusive waiter"—that is, a core process waiting for an exclusive latch on a section—is not "starved." That is, once a core process or thread signals its intention to acquire a latch exclusively by setting an fExclusive flag, no other share latches may be acquired on that section.

Latch Log

Figure 7:
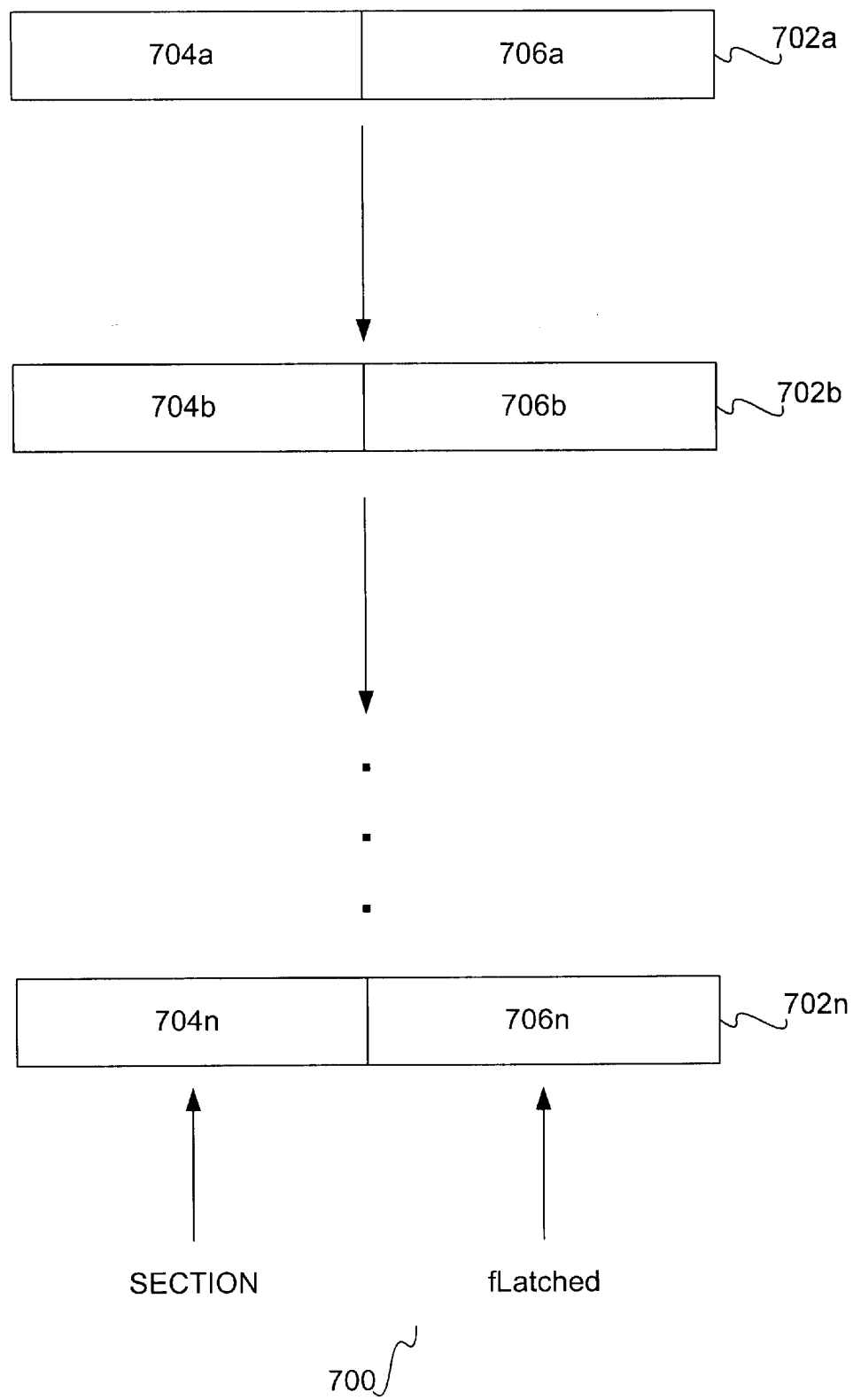
FIG. 7 is a diagram of a latch log structure, according to one embodiment of the invention.

In this section of the detailed description, a description of a latch log used by client processes, and how the latch log can be used by a core process to release any remaining share latches of a client process when the client process is terminated, is presented. Referring first to FIG. 7, a diagram of a latch log data structure 700 according to one embodiment of the invention is shown. There is a latch log 700 for each client process. In one embodiment, when a client process is registered with the operating system, as known within the art, at this time it obtains a latch log. In one embodiment, a page of writable shared memory is registered with the client process, and used thereby as its latch log. A core process in one embodiment keeps track of which latch log page is assigned to which process, so that it can determine which latch log needs to be examined if a client process terminates abnormally, as is described later in the detailed description. In one embodiment, there is no latch log for exclusive latches, since such latches can only be asserted and acquired by the core process (which is presumed not to terminiate irregularly, that is, abnormally, such as by crashing).

The latch log 700 is an array of entries 702*a*, 702*b*, . . . , 702*n*. Each entry includes a reference or pointer to a database section (which can in a non-restrictive sense be referred to as a memory section where the database is an in-memory database, or where the database section is otherwise stored in memory, virtual or otherwise). Thus, the entry 702*a* has a section reference 704*a*, the entry 702*b* has a section reference 704*b*, and so on, such that the entry 702*n* has a section reference 704*n*. In one embodiment, the section reference of an entry refers to the page number of a page that is share latched by the process corresponding to the latch log. Furthermore, the section reference of an entry has a null value when the entry is empty.

Each entry also includes a latch flag, referred to as an latched flag, indicating whether the process corresponding to the latch log has asserted a share latch on the section as referenced by the section reference of the entry. Thus, the entry 702*a* has an fLatched flag 706*a*, the entry 702*b* has a fLatched flag 706*b*, and so on, such that the entry 702*n* has a section reference 706*n*. In one embodiment, the fLatched flag is Boolean, such that it is true when the process has asserted a share latch on the section referenced by the section reference of the entry, and is false when the process has not asserted such a share latch. As is described later in the detailed description, in one embodiment, there is a window of time when setting or clearing a share latch when it is uncertain whether the client process, before it terminated, latched the page. If the fLatched flag is set (i.e., it is true), then it is known that the process had the page latched; if the flag is not set (i.e., it is false), then the page may or may not have been latched.

Next, how a client process allocates a latch log entry, share latches a page (viz., database section) in conjunction with the latch log, and releases a share latch in conjunction with the latch log, according to specific embodiments, is described. Each of these processes utilizes one or more of the following variables to manage their use of the latch log. A first variable is a pointer to the first latch log entry. A second variable is a pointer to the end of the latch log (i.e., after the last latch log entry). Both of these variables, once the latch log is allocated for a client process, do not change. A third variable, that does change, is a pointer to the next latch log entry to be allocated. A fourth and final variable is a spinlock. A spinlock is a type of variable known within the art, and is set to protect the latch log from being accessed or modified by other threads and processes while the latch log is being modified. There is a set of these four variables for each latch log.

Figure 8:
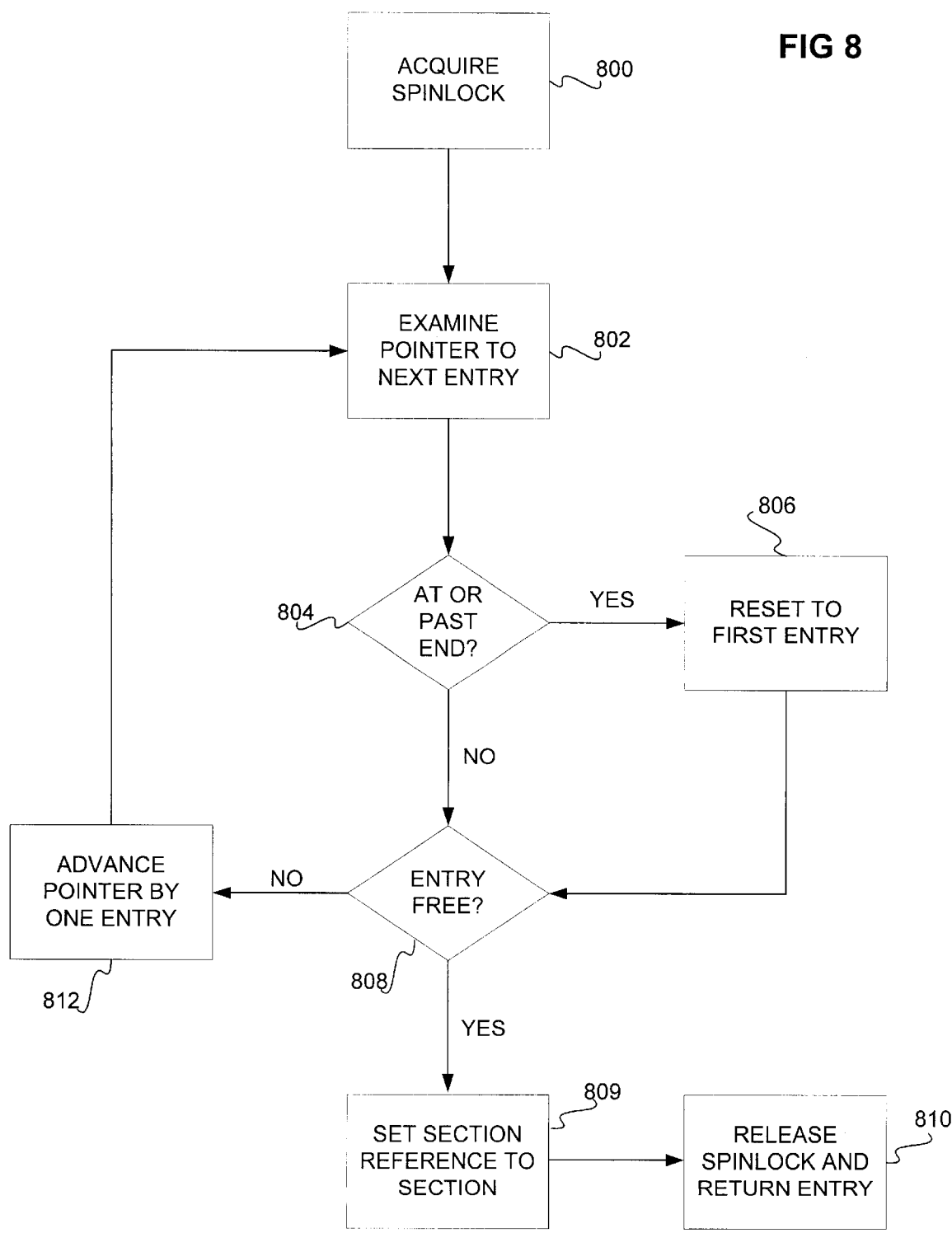
FIG. 8 is a flowchart of a method for a client process to allocate an entry within a latch log, according to one embodiment of the invention.

Referring now to FIG. 8, a flowchart of a method for allocating a latch log entry, according to one embodiment of the invention, is shown. In 800, the spinlock for the latch log is acquired, to protect the latch log from access or modification by other processes and threads. In 802, the pointer to the next log entry is examined. If this pointer is at or past the end of the latch log, as pointed to by the pointer to the end of the latch log, then the method proceeds from 804 to 806, where the pointer to the next log entry is reset to the pointer to the first latch log entry. The method then proceeds to 808. The method also proceeds to 808 from 804 when the pointer to the next log entry is not at or past the end of the latch log.

In 808, it is determined whether the latch log entry pointed to by the pointer to the next log entry is free. This is accomplished by determining whether the section reference of the entry is null. If it is null, then the entry is determined to be free, and the method proceeds to 809, where the section reference of the entry of the latch log is set to point to or reference the desired database section, which in one embodiment includes setting the section reference to the number of the page that is to be share latched. Furthermore, in one embodiment, the pointer is advanced to the next log entry, or to the first log entry, if the last log entry has already been reached. From 809, the method proceeds to 810, where the spinlock is released, and the entry is returned. If the section reference of the entry is not null, then the method proceeds instead from 808 to 812, where the pointer to the next log entry is advanced by one entry, and the method returns to 802, and part of the method is repeated, until ultimately a free entry can be found.

Figure 9:
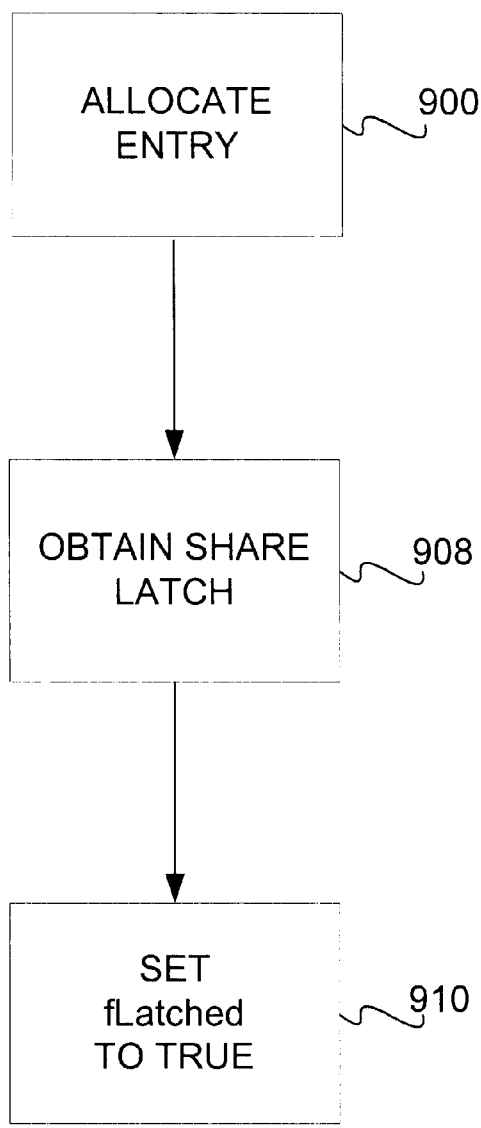
FIG. 9 is a flowchart of a method for a client process to share latch a database section in conjunction with a latch log, according to an embodiment of the invention.

Referring next to FIG. 9, a flowchart of a method for share latching a database section in conjunction with the latch log, according to one embodiment of the invention, is shown. In 900, a latch log entry is allocated, for example, by performing the method of FIG. 8. In 908, a share latch, a share latch is acquired on the desired database section, as described in the previous section of the detailed description, desirably by waiting until a share latch is obtained. Finally, in 910, the latched flag of the entry is set to true, to indicate that the desired database section has been share latched.

It is noted that if the client process performing the method of FIG. 9 were to abnormally or otherwise irregularly terminate after 900 or before 910, such as by crashing, a potential problematic situation exists. If the client process terminates after 900, for example, this means that the section reference of the entry refers to the section that was desired by the process to be share latched, while the fLatched flag is still false, and such that no share latch in fact exists. Furthermore, if the client process terminates after 908, for example, this means that the section reference of the entry refers to the section that was desired by the process to be share latched, and such a share latch does exist, but the fLatched flag improperly indicates false. The clearing of such share latches by the core process according to varying embodiments of the invention is described later in the detailed description.

Figure 10:
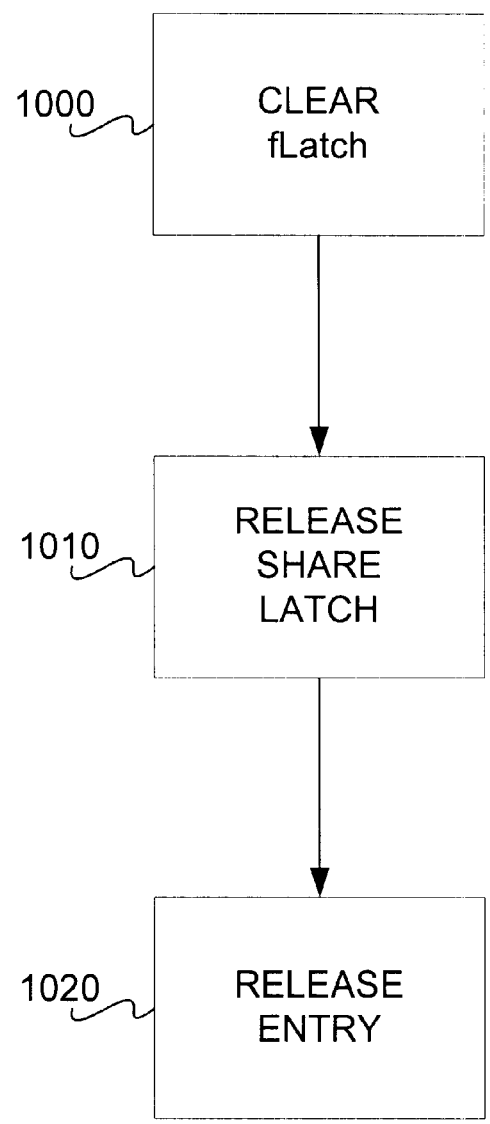
FIG. 10 is a flowchart of a method for a client process to release a share latch previously asserted on a database section in conjunction with a latch log, according to an embodiment of the invention.

Referring finally to FIG. 10, a flowchart of a method for releasing a share latch asserted on a database section in conjunction with the latch log, according to one embodiment of the invention, is shown. In 1000, the fLatched flag of the latch log entry corresponding to the share latch of the process is cleared, that is, it is reset to false. In 1010 the share latch on the database section referred by the section reference of the entry is released, for example, as described in the previous section of the detailed description. Finally, in 1020, the latch log entry is itself released. This is accomplished by setting the database section of the entry to null.

The above methods of FIGS. 8–10 can be modified to take into account multi-processor considerations, so that performance of the system is not degraded. Poor performance may result on a multi-processor system where throughput is limited by threads of processes stacking on the spinlock. To improve performance in this environment, in one embodiment, the latch log can be divided into ranges, where each range has the four variables described earlier. Thus, there is an array of range variables that is set up upon initialization of the acquisition of the latch log from a core process. A fixed number of ranges can be allocated by dividing the total number of log entries by the number of ranges desired to be used. In such an embodiment, allocation of a latch log entry can then proceed by first determining which range to use, and using the appropriate set of four variables for this range when allocating a latch log entry as has been described.

Next, the manner by which the latch logs for client processes is managed by a core process, according to a specific embodiment, is described. A core process is responsible for allocating latch logs and for processing them upon the termination of a client process. When the core process is initialized, it allocates a fixed number of latch logs, in one embodiment. In one embodiment, these are created in a read/write portion of shared memory between the client processes and the core process. A bitmap can be used in one embodiment, to signify whether a given latch log has been allocated to a client process.

Figure 11:
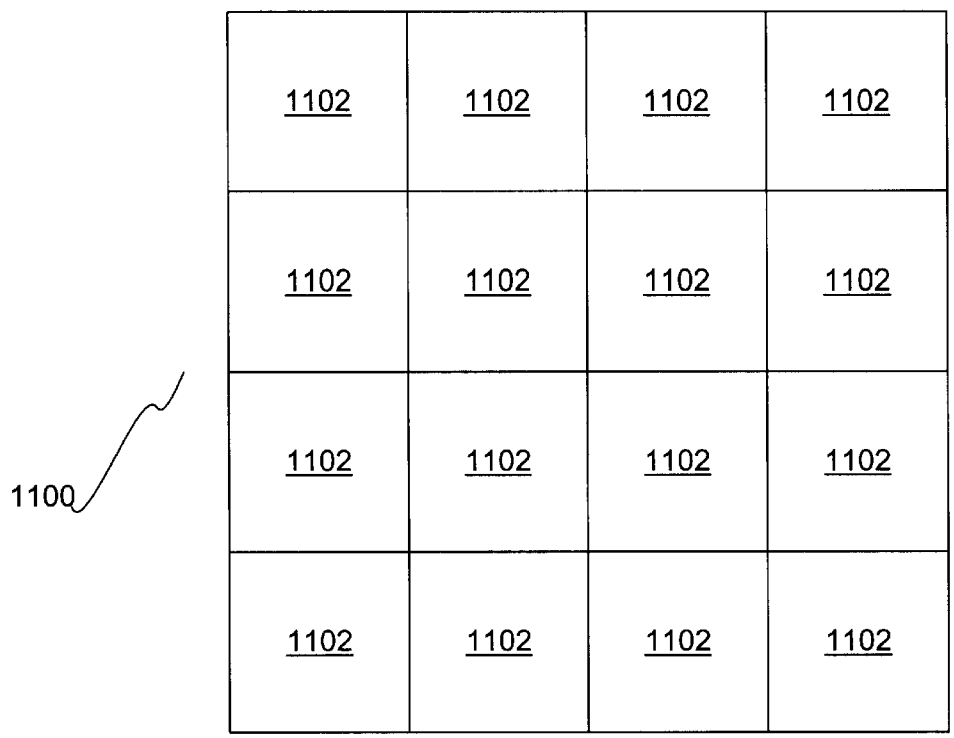
FIG. 11 is a diagram of a bitmap structure that can be used to allocate latch logs to client processes by a core process, according to an embodiment of the invention.

A diagram of such a bitmap structure is shown in FIG. 11. The bitmap structure 1100 includes a plurality of bits 1102. Each bit 1102 corresponds to a different latch log. When a latch log has been allocated to a client process, the corresponding bit 1102 is set to one to indicate that the latch log is being used. Otherwise, a bit 1102 is set to zero to indicate that the latch log is free to be allocated to a client process.

Figure 12:
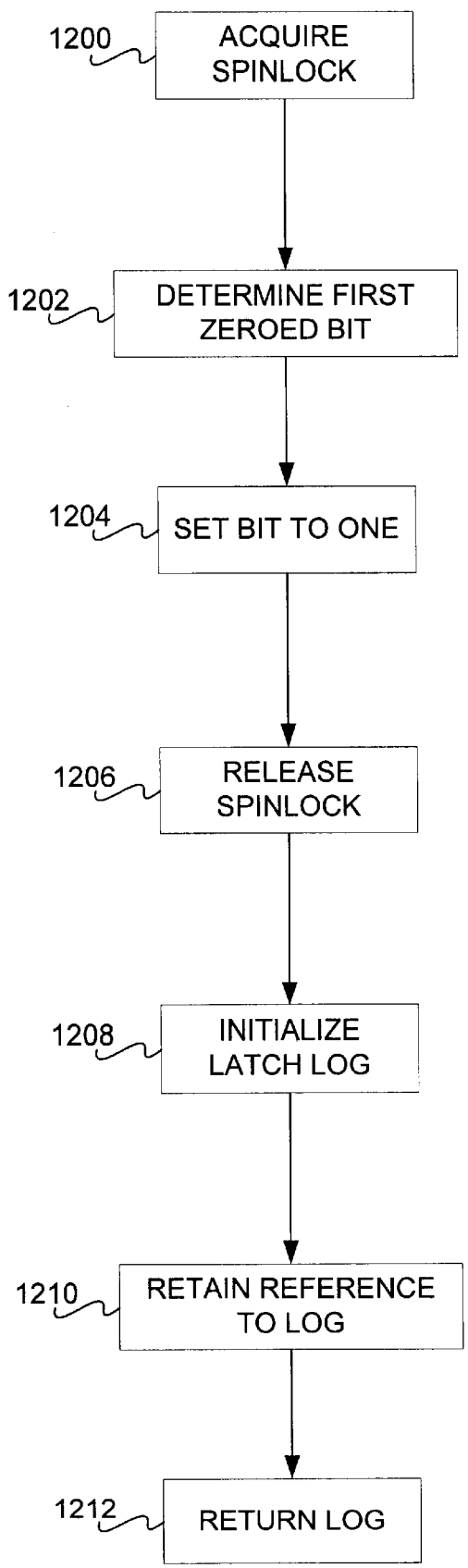
FIG. 12 is a flowchart of a method for a core process to allocate a latch log to a client process utilizing a bitmap, according to an embodiment of the invention.

Referring to FIG. 12, a flowchart of a method performed by a core process to allocate a latch log to a client process, according to an embodiment of the invention, is shown. In 1200, the spinlock for the bitmap structure is acquired, to protect the bitmap from other attempts to write to it. In 1202, the first zeroed bit in the bitmap is determined, to determine which latch log to allocate to the requesting client process. In 1204, this bit is set to one,to indicate that it is being used, and in 1206, the spinlock for the bitmap is released.

Next, in 1208, the latch log referenced by the bit of the bitmap set in 1204 is initialized, by setting the section reference of each entry to null, and the fLatched flag of each entry to false. In 1210, a reference to this latch log as corresponding to the requesting client process is retained. In one embodiment, this reference can be retained in a registration data structure that maintains other information about the client process as well, as can be appreciated by those of ordinary skill within the art. Finally, in 1212, a reference to the latch log is returned to the client process, so that it knows which latch log to use.

Referring finally to FIG. 13, a flowchart of a method performed by a core process upon the termination of a client process, according to an embodiment of the invention, is shown. In 1300, the latch log for the client process that has terminated is determined. In 1302, the latch log is scanned, such that 1304, 1306, 1308, 1310, and 1312 are performed as necessary for each entry of the latch log. In 1304, if the section reference of the entry has the value null, then the method ends for that entry in 1306. Otherwise, the section reference of the entry points or otherwise refers to a section, and the method proceeds with 1308. That is, if the section reference of the entry does not have the value null, then this indicates that a section as pointed or referred to by the section reference of the entry has been located, such that the method proceeds with 1308.

In 1308, it is determined whether the fLatched flag is true. If it is true, then this indicates that the section reference refers to a section that the client process had asserted a share latch prior to its termination, such that the share latch is still being asserted on the section. Therefore, the method proceeds to 1310, where the share latch is released, as can be accomplished as described in the preceding section of the detailed description, and the method ends for this latch log entry in 1306.

If the fLatched flag is false, however, then this indicates that the section referred to by the section reference of the entry may or may not have had a share latch asserted thereon by the client process prior to its termination. As has been described, an empty log entry needs in one embodiment both the fLatched flag being false and the section reference having a null value. Where the latter does not have a null value, but the former is false, this can indicate, among other things, that the client process irregularly or abnormally terminated—i.e., crashed—while it was latching a page, as has been described earlier in this section of the detailed description. Therefore, the method proceeds from 1308 to 1312, where it is determined whether a share latch of the terminated client process is still being asserted on the section referenced by the section reference of the latch log entry, and, if so, the share latch is cleared. In one embodiment, this can be accomplished by the method described in the next section of the detailed description. Upon performance of 1312, the method ends for this latch log entry in 1306.

Thus, the method of FIG. 13, determines whether the client has asserted a share latch on a section, taking into account potential occurrence of the situation that the fLatched flag of a latch log entry indicating whether the client process has asserted a share latch on the section referred to by the section reference of the entry may be incorrect. In one embodiment, this can in 1312 of the method include determining whether the client process terminated after the fLatched flag of the entry was set to indicate that the process has not asserted the share latch (i.e., after the fLatched flag was set to, false), but before the share latch was actually cleared or released (i.e., unasserted). In another embodiment, this can in 1312 include determining whether the client process terminated after that share latch was actually asserted, but before the fLatched flag of the entry was set to indicate that the client process has asserted the latch (i.e., before the fLatched flag could be set to true).

Not shown in FIG. 13 is that in one embodiment where a bitmap is employed to indicate whether a given latch log has been allocated to a client process, the bit of the bitmap corresponding to the latch log for the terminated client process is also cleared by the method. In one embodiment, this can include acquiring a spinlock for protecting the bitmap, clearing the bit corresponding to the latch log for the terminated client process, and then releasing the spinlock.

Clearing Share Latches upon Process Termination

In this section of the detailed description, a manner by which share latches asserted by a client process can be cleared upon the termination of the process, according to one embodiment of the invention, is described. In one embodiment, the method described in this section is called to determine whether a share latch was acquired by a client process when the client process was terminated, knowing only that the process terminated in an irregular or abnormal manner while acquiring a share latch or releasing it, as described in the previous section of the detailed description. In one embodiment, the method is particularly useful when share latches are not held by their client processes for a relatively long time, although the invention itself is not so limited. That is, the method in at least some embodiments is operable when the method waits longer than the maximum time that a share latch is acquired by a client process, such that the maximum time that a share latch is acquired by a client process should not be arbitrarily long. It is also noted the method described in this section assumes that a client process has already been determined to have terminated, for example, by a core process invoking this method after receiving indication from the operating system that the client process has terminated.

Referring to FIG. 14, a flowchart of a method to accomplish this clearing of share latches of a client process that terminated while acquiring or releasing a share latch, according to one embodiment of the invention, is shown. The method can be performed by a core process that has already determined that the client process has in fact terminated. In 1400, the method attempts to assert an exclusive latch on a section of a database that has been indicated as potentially being share latched by the terminated client process. Such indication, for example, may be as a result of scanning a latch log in one embodiment, although the invention itself is not so limited. If the exclusive latch was successfully asserted, then this means that the section of the database is not share latched by any process, including the terminated client process. The method therefore concludes that there is not a share latch of the client process still being asserted onto the section of the database. Thus, the method proceeds from 1402 to 1404, where the exclusive latch is released by the method (e.g., by calling an exclusive latch release method, such as that described in a previous section of the detailed description), and then to 1406, where the method ends.

However, if the exclusive latch could not be obtained by the method, then the method proceeds from 1402 to 1405. In 1405, the fExclusive flag for this section of the database is attempted to be set to true, as described in a previous section of the detailed description. If the fExclusive flag could be obtained—that is, if could be set to true by the method—this indicates an exclusive latch is not already being asserted on the database section by another thread of the core process, but that one or more share latches are being asserted on the database section, since the method could not obtain an exclusive latch for the section. The fExclusive flag being set also indicates that no further share latches can be asserted on the database section, although already existing ones are still present. The method then proceeds from 1405 to 1407 in this case.

In 1407, a counter is initialized, in one embodiment, to zero. In 1408, the method waits for a predetermined length of time. In 1410, it is determined if the cShared counter for the section is now zero, indicating that while the method was waiting in 1408, the already existing share latches on the database section have been released by their processes (that is, in 1410, it is determined whether no share latch is still being asserted on the section). If this is the case, then this means that the terminated client process could not have still had a share latch of its own asserted on the database section, since all share latches thereon have been cleared. Therefore, the method concludes that no share latch of the terminated client process is still being asserted on the database section, and the method proceeds to 1404, where the exclusive latch clear call is made (to clear the fExclusive flag that has been set), and the method is finished in 1406.

However, if it is determined that the cShared counter for the section is not zero, then the method proceeds from 1410 to 1412, where the method increases the counter initialized in 1406. In 1414, it is determined if the counter is less than a predetermined threshold. In one embodiment, the threshold corresponds to about five seconds. If the counter is less than the threshold, then the method proceeds back to 1408, to wait again. Otherwise, however, the counter is equal or greater to the threshold, indicating that a length of time has been waited (e.g., about five seconds in one embodiment), and all the share latches previously asserted on the section have not been cleared. Therefore, the method concludes that a share latch of the terminated client is still being asserted on the database section, and proceeds to 1416, to decrement the cShared counter, which effectively clears the share latch of the terminated client still being asserted on the section. The method then proceeds to 1404, where the exclusive latch clear call is made (to clear the fExclusive flag that has been set), and the method is finished in 1406.

Going back to 1405 of FIG. 14, if the fExclusive flag was not set (that is, was not obtained) by the method, then this means that another process already has an exclusive latch on the database section. That is, another exclusive latch already is being asserted on the database'section. Therefore, the method proceeds in this case from 1405 to 1418. In 1418, the cShared counter is incremented, such as described in a previous section of the detailed description, to prevent any other core process or thread from obtaining an exclusive latch on the database section. In 1420, another flag, which can be referred to as the fExclusivelyLatched flag (and which is distinct from the fExclusive flag for the database section) is initialized to false. The fExclusivelyLatched flag indicates whether the method has exclusively latched the section or not—as opposed to, for example, another thread of the core process. In 1422, a counter is initialized, for example, to zero. In 1424, the method waits for a predetermined length of time. Thus, the method is waiting while an exclusive latch on the section is being asserted by another thread of the core process, or, as will be described, is being asserted by the method itself.

In 1426, the method examines the cShared counter to determine if it is equal to one. If so, this means that there are no share latches asserted on the section; the cShared counter is equal to one and not zero because it had been incremented by the method itself in 1418. In other words, it is determined that there are not any shared latches still being asserted on the section, and the method has concluded that there is not a share latch being asserted still by the terminated client process on the section. The method then proceeds to 1428, where it is determined whether the fExclusivelyLatched flag is set to true; if it is, this also means that the fExclusive flag is set to true for the section. If these flags are true, then the method proceeds to 1430, to make an exclusive latch clear call, to clear the fExclusive flag, and the method proceeds to 1432. The method also proceeds to 1432 from 1428 if the fExclusivelyLatched flag has not been set to true. In 1432, the cShared counter is decremented, for example, as described in a preceding section of the detailed description, to undo the incrementation of the cShared counter in 1418, and the method ends at 1406.

However, if in 1426 it is determined that the cShared counter is not equal to one, that is, it is greater than one, then the method instead proceeds from 1426 to 1434. In 1434, the method attempts to again obtain the fExclusive flag for this section of the database, as described in a previous section of the detailed description. If the fExclusive flag could be obtained—that is, if could be set to true by the method—this indicates an exclusive latch is not already being asserted on the database section by another thread of the core process (thus, the exclusive latch asserted by a different core process or thread has been released thereby), but that one or more share latches are being asserted on the database section, since the method could not obtain an exclusive latch for the section. The fExclusive flag being set also indicates that no further share latches can be asserted on the database section, although already existing ones are still present. The method then proceeds to 1436 if the fExclusive flag is obtained, to set the fExclusivelyLatched flag, and then the method proceeds back to 1422.

However, if the fExclusive flag cannot be obtained in 1434, then the method instead proceeds from 1434 to 1438, where the counter is incremented. In 1440, the counter is compared to a predetermined threshold. In one embodiment, the threshold is such that it corresponds to the method waiting about five seconds via the waits of 1424. (As has been described, the method potentially could reinitialize the counter in 1422 after it has already been initialized. This is to ensure that at least five seconds are waited once an exclusive latch is held by the method, as indicated by the fExclusive flag being successfully acquired in 1434.) In 1440, if the counter is less than the predetermined threshold, then the method proceeds from 1440 back to 1424, to wait again.

Otherwise, if the counter is equal to or greater than the predetermined threshold—for example, corresponding to at least five seconds—then this indicates that that a relatively large amount of time has passed without the cShared counter going down to one. Thus, the method concludes that the share latch of the terminated client process is still being asserted. Therefore, the method proceeds to 1442, where the cShared counter is decremented, as described in a previous section of the detailed description, to effectively clear the share latch of the terminated client process, and then the method proceeds to 1428, such that ultimately the cShared counter is decremented in 1432, to offset the incrementation of the cShared counter in 1418, and the method is finished in 1406.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

Furthermore, it is noted that any of the methods described herein can be computer-implemented methods. The computer-implemented methods can be realized at least in part as one or more programs running on a computer—that is, as a program executed from a computer-readable medium such as a memory by a processor of a computer, such as the computer shown in and described in conjunction with FIG.

1. The programs are desirably storable on a machine-readable medium such as a floppy disk or a CD-ROM, for distribution and installation and execution on another computer. It is further noted that in one embodiment of the invention, latches, whether they are share or exclusive, are desirably held (that is, asserted) for short periods of time by their processes, although the invention is not so limited.

We claim:

1. A computer-implemented method operable on a database access to which is governed by a core process able to assert an exclusive latch onto a section of the database and a client process able to assert a share latch onto the section the database, the method comprising:

determining that the client process has terminated;

upon determining that the client process has terminated, determining whether the share latch of the client is still being asserted onto the section of the database; and, upon determining that the share latch of the client is still being asserted onto the section of the database, clearing the share latch, wherein the determination of whether the share latch of the terminated client is still asserted comprises attempting to assert the exclusive latch onto the section of the database.

2. The method of claim 1, wherein determining that the client process has terminated comprises receiving indication from an operating system that the client process has terminated.

3. The method of claim 1, wherein determining whether the share latch of the client is still being asserted onto the section of the database further comprises upon determining that attempting to assert the exclusive latch onto the section of the database was successful, concluding that the share latch of the client is not still being asserted onto the section of the database.

4. The method of claim 1, wherein the method is performed by the core process.

5. The method of claim 4, wherein the method is performed by one of at least one thread of the core process.

6. The method of claim 1, wherein the database comprises an in-memory database.

7. A computer-implemented method operable on a database access to which is governed by a core process able to assert an exclusive latch onto a section of the database and a client process able to assert a share latch onto the section the database, the method comprising:

determining that the client process has terminated;

upon determining that the client process has terminated, determining whether the share latch of the client is still being asserted onto the section of the database; and, upon determining that the share latch of the client is still being asserted onto the section of the database, clearing the share latch, wherein the determination of whether the share latch of the terminated client is still asserted comprises attempting to assert the exclusive onto the section of the database, wherein determining whether the share latch of the client is still being asserted onto the section of the database comprises:

attempting to assert the exclusive latch onto the section of the database; and, upon determining that attempting to assert the exclusive latch onto the section of the database was successful, concluding that the share latch of the client is not still being asserted onto the section of the database, wherein determining whether the share latch of the client is still being asserted onto the section of the database further comprises, upon determining that attempting to assert the exclusive latch onto the section of the database was unsuccessful, determining whether another exclusive latch is already being asserted onto the section of the database, upon determining that another exclusive latch is not already being asserted onto the section of the database, waiting for a predetermined length of time;

determining whether any shared latches are still being asserted on the section of the database;

concluding that the share latch of the client is still being asserted on the section of the database upon determining that there are any shared latches still being asserted on the section of the database; and, otherwise concluding that the share latch of the client is not still being asserted on the section of the database.

8. The method of claim 7, wherein determining whether the share latch of the client is still being asserted onto the section of the database further comprises, upon determining that attempting to assert the exclusive latch onto the section of the database was unsuccessful and upon determining that another exclusive latch is already being asserted onto the section of the database, waiting for at least a second predetermined length of time while another exclusive latch is being asserted onto the section of the database;

while waiting, determining whether any share latches are still being asserted on the section of the database by client processes including the client process;

upon determining that there are not any shared latches still being asserted on the section of the database by client processes including the client process, concluding that the share latch of the client is not still being asserted on the section of the database; and, otherwise, after waiting, concluding that the share latch of the client is still being asserted on the section of the database.

9. A machine-readable medium having instructions stored thereon for execution by a processor to perform a method operable on a database access to which is governed by a core process able to assert an exclusive latch onto a section of the database and a client process able to assert a share latch onto the section of the database, the method comprising:

determining that the client process has terminated;

upon determining that the client process has terminated, attempting to assert the exclusive latch onto the section of the database;

upon determining that attempting to assert the exclusive latch onto the section of the database was successful, concluding that the share latch of the client is not still being asserted onto the section of the database;

upon determining that attempting to assert the exclusive latch onto the section of the database was unsuccessful, determining whether the share latch of the client is still being asserted onto the section of the database; and, upon concluding that the share latch of the client is still being asserted onto the section of the database, clearing the share latch.

10. The medium of claim 9, determining that the client process has terminated comprises receiving indication from an operating system that the client process has terminated.

11. The medium of claim 9, wherein the method is performed by the core process.

12. The medium of claim 11, wherein the method is performed by one of at least one thread of the core process.

13. A machine-readable medium having instructions stored thereon for execution by a processor to perform a method operable on a database access to which is governed by a core process able to assert an exclusive latch onto a section of the database and a client process able to assert a share latch onto the section the database, the method comprising:

determining that the client process has terminated;
upon determining that the client process has terminated,
attempting to assert the exclusive latch onto the section of the database;
upon determining that attempting to assert the exclusive latch onto the section of the database was successful, concluding that the share latch of the client is not still being asserted onto the section of the database;
upon determining that attempting to assert the exclusive latch onto the section of the database was unsuccessful, determining whether the share latch of the client is still being asserted onto the section of the database; and,
upon concluding that the share latch of the client is still being asserted onto the section of the database, clearing the share latch,
wherein determining whether the share latch of the client is still being asserted onto the section of the database comprises:
determining whether another exclusive latch is already being asserted onto the section of the database;
upon determining that another exclusive latch is not already being asserted onto the section of the database,
waiting for a predetermined length of time;
determining whether any shared latches are still being asserted on the section of the database;
concluding that the share latch of the client is still being asserted on the section of the database upon determining that there are any shared latches still being asserted on the section of the database; and,
otherwise concluding that the share latch of the client is not still being asserted on the section of the database.

14. The medium of claim 13, wherein determining whether the share latch of the client is still being asserted onto the section of the database further comprises, upon determining that another exclusive latch is already being asserted onto the section of the database, waiting for at least a second predetermined length of time while one of the another exclusive latch is being asserted onto the section of the database;
while waiting, determining whether any share latches are still being asserted on the section of the database by client processes including the client process;
upon determining that there are not any shared latches still being asserted on the section of the database by client processes including the client process, concluding that the shared latch of the client is not still being asserted on the section of the database; and,
otherwise, after waiting, concluding that the share latch of the client is still being asserted on the section of the database.

15. A computer-implemented method comprising:
for a client process that has terminated, determining a latch log having a plurality of entries;
scanning each entry of the latch log for a section of the entry;
upon locating a section of an entry,
determining whether the client process has asserted a share latch on the section, taking into account potential occurrence that a latch flag of the entry indicating whether the client process has asserted the share latch is incorrect; and,
clearing a share latch for the section upon determining that the client process has asserted the share latch on the section.

16. The method of claim 15, wherein the latch flag of the entry indicating whether the client process has asserted the share latch is incorrect based on irregular termination of the client process.

17. The method of claim 15, wherein determining whether the client process has a share latch on the section comprises determining whether the client process terminated after the latch flag of the entry was set to indicate that the client process has not asserted the share latch but before the share latch was unasserted.

18. The method of claim 15, wherein determining whether the client process has a share latch on the section comprises determining whether the client process terminated after the share latch has been asserted but before the latch flag of the entry was set to indicate that the client process has asserted the share latch.

19. The method of claim 15, wherein the section comprises a section of a database.

20. The method of claim 15, wherein the section comprises a memory section.

21. The method of claim 15, wherein the method is performed by the core process.

22. The method of claim 21, wherein the method is performed by one of at least one thread of the core process.

23. A machine-readable medium having instructions stored thereon for execution by a processor to perform a method comprising:

for a client process that has terminated, determining a latch log having a plurality of entries;
scanning each entry of the latch log for a section of the entry;
upon locating a section of an entry,
determining whether the client process terminated after the latch flag of the entry was set to indicate that the client process has not asserted the share latch but before the share latch was unasserted; and,
clearing a share latch for the section upon so determining.

24. The medium of claim 23, wherein the section comprises a section of a database.

25. The medium of claim 23, wherein the section comprises a memory section.

26. A machine-readable medium having instructions stored thereon for execution by a processor to perform a method comprising:

for a client process that has terminated, determining a latch log having a plurality of entries;
scanning each entry of the latch log for a section of the entry;
upon locating a section of an entry,
determining whether the client process terminated after the share latch has been asserted but before a latch flag of the entry was set to indicate that the client process has asserted the share latch; and, clearing a share latch for the section upon so determining.

27. The medium of claim 26, wherein the section comprises a section of a database.

28. The medium of claim 26, wherein the section comprises a memory section.

29. A computerized system comprising:

a database having a plurality of sections;

a client process capable of asserting a share latch on a section of the database; and, a core process capable of asserting an exclusive latch on a section of the database in order to determine whether a share latch is asserted on the section by a terminated client process, wherein the core process is capable of clearing the share latch asserted by the client process upon termination of the client process while the share latch is still asserted.

30. The system of claim 29, wherein the database comprises an in-memory database.

31. The system of claim 29, wherein each section of the database corresponds to a page of the database.

32. The system of claim 29, wherein the share latch permits the client process to have shared read-only access to the section of the database.

33. The system of claim 29, wherein the client process comprises at least one thread, such that each thread is capable of asserting a share latch on a section of the database.

34. The system of claim 29, wherein the exclusive latch permits the core process to have exclusive read-and-write access to the section of the database.

35. The system of claim 29, where the core process comprises at least one thread, such that each thread is capable of asserting an exclusive latch on a section of the database.

36. The system of claim 35, wherein a thread of the core process is spawned upon notification that a client process has terminated, the thread to clear the share latch asserted by the client process while still asserted.

37. A machine-readable medium having instructions stored thereon to transform a general-purpose computer to a special-purposed computer comprising:

a database having a plurality of sections;

means for asserting a share latch on a section of the database; and, means for asserting an exclusive latch on a section of the database and for clearing the share latch asserted by the client process upon termination of the client process while the share latch is still asserted;

wherein the exclusive share latch is asserted on a section of the database in order to determine whether the client process terminated while the share latch is still asserted.

38. The medium of claim 37, wherein the database comprises an in-memory database.

39. The medium of claim 37, wherein each section of the database corresponds to a page of the database.

\* \* \* \* \*

UNITED STATES PATENT AND TRADEMARK OFFICE
CERTIFICATE OF CORRECTION

PATENT NO.    : 6,594,660 B1
DATED         : July 15, 2003
INVENTOR(S)   : Berkowitz et al.

It is certified that error appears in the above-identified patent and that said Letters Patent is hereby corrected as shown below:

Column 2,
Line 47, "and or" should be -- and/or --.
Line 51, "is" should be -- if --.

Column 4,
Line 31, "include" should be -- including --.

Column 5,
Lines 34 & 43, "Internal" should be -- Internet --.

Column 7,
Line 24, "data base" should be -- database --.
Line 39, "Exclusive" should be -- fExclusive --.

Column 10,
Lines 46-47, "an latched" should be -- an fLatched --.

Column 12,
Line 8, "In 1010" should be -- In 1010, --.
Line 55, "one, to" should be -- one to --.

Column 13,
Line 53, "to," should be -- to --.

Column 15,
Line 34, "database' section" should be -- database section --.

Column 16,
Line 39, "that that" should be -- that --.

UNITED STATES PATENT AND TRADEMARK OFFICE
CERTIFICATE OF CORRECTION

PATENT NO. : 6,594,660 B1
DATED : July 15, 2003
INVENTOR(S) : Berkowitz et al.

It is certified that error appears in the above-identified patent and that said Letters Patent is hereby corrected as shown below:

<u>Column 17,</u>
Line 56, "exclusive" should be -- exclusive latch --.

<u>Column 19,</u>
Line 11, "the database" should be -- of the database --.
Line 54, "one of the another exclusive latch" should be -- the another exclusive latch --.

Signed and Sealed this

Twentieth Day of April, 2004

JON W. DUDAS
*Acting Director of the United States Patent and Trademark Office*